(12) United States Patent
Shi

(10) Patent No.: US 8,335,221 B2
(45) Date of Patent: Dec. 18, 2012

(54) METHOD FOR LISTENING TO SIGNAL TONE FROM A CALLED PARTY BY A CALLING PARTY DURING NETWORK INTERWORKING

(75) Inventor: Youzhu Shi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1532 days.

(21) Appl. No.: 11/707,759

(22) Filed: Feb. 16, 2007

(65) Prior Publication Data

US 2007/0201663 A1  Aug. 30, 2007

Related U.S. Application Data

(63) Continuation of application No. PCT/CN2006/001049, filed on May 22, 2006.

(30) Foreign Application Priority Data

May 29, 2005 (CN) .......................... 2005 1 0034992

(51) Int. Cl.
*H04M 3/42* (2006.01)
(52) U.S. Cl. .... 370/401; 370/352; 370/392; 379/201.01
(58) Field of Classification Search .................. 370/401, 370/352, 395.2, 476; 379/88.02
See application file for complete search history.

(56) References Cited

U.S. PATENT DOCUMENTS

| | | | |
|---|---|---|---|
| 7,408,925 B1 * | 8/2008 | Boyle et al. ................. | 370/352 |
| 7,577,109 B2 | 8/2009 | Belling | |
| 7,885,208 B2 | 2/2011 | Mutikainen et al. | |
| 2002/0163999 A1 * | 11/2002 | Farris et al. ............... | 379/88.02 |

(Continued)

FOREIGN PATENT DOCUMENTS

CN 1879808 A 10/2006

(Continued)

OTHER PUBLICATIONS

Sinnreich, H., et al. "Internet Communications Using SIP, Passage" 2001, Internet Communications Using SIP: Delivering VOIP and Multimedia Services With Session Initiation Protocol, John Wiley & Sons, New York pp. 127-139.
Written Opinion of the International Searching Authority, PCT/CN2006/001049, dated Sep. 7, 2006, 3 pages.

(Continued)

*Primary Examiner* — Robert Wilson
*Assistant Examiner* — Mohamed Kamara
(74) *Attorney, Agent, or Firm* — Slater & Matsil, L.L.P.

(57) ABSTRACT

A method for listening to signal tone from a called party by a calling party during network interworking. When the media gateway control unit receives an Address Complete message or Call Progress message from the circuit domain network, the media gateway control unit instructs a media gateway to open a media stream channel. If the received message carries an indicator indicating the called party is free, the media gateway control unit sends a Ringing response message to the packet core network; if the received message does not carry a indicator indicating the called party is free, the media gateway control unit sends a response message carrying indicator of failed call but successful media stream setup or a response message indicating failed call but successful media stream setup to the packet core network. With the method according to the embodiments of the present invention, the calling party may hear ring-back tone indicating successful call, or signal tone or voice announcement indicating failed call.

14 Claims, 4 Drawing Sheets

U.S. PATENT DOCUMENTS

| | | | |
|---|---|---|---|
| 2003/0026245 A1 | 2/2003 | Ejzak | |
| 2003/0128694 A1 | 7/2003 | Hundscheidt et al. | |
| 2004/0190489 A1* | 9/2004 | Palaez et al. | 370/351 |
| 2005/0058125 A1 | 3/2005 | Mutikainen et al. | |
| 2007/0002775 A1 | 1/2007 | Belling | |
| 2007/0041357 A1 | 2/2007 | Hoffmann et al. | |
| 2007/0058537 A1 | 3/2007 | Belling | |
| 2007/0201663 A1 | 8/2007 | Shi | |
| 2007/0268930 A1* | 11/2007 | Bond et al. | 370/467 |
| 2010/0220715 A1* | 9/2010 | Cherchali et al. | 370/352 |

FOREIGN PATENT DOCUMENTS

| | | |
|---|---|---|
| CN | 1870691 A | 11/2006 |
| CN | 100563282 C | 11/2009 |
| WO | 2004/086703 A1 | 10/2004 |
| WO | WO 2005/027487 A1 | 3/2005 |
| WO | WO 2005/039139 A1 | 4/2005 |
| WO | WO 2005/039140 A1 | 4/2005 |

OTHER PUBLICATIONS

ITU-T, "Series Q: Switching and Signalling, Specifications of signalling related to Bearer Independent Call Control (BICC), Interworking between Session Initiation Protocol (SIP) and Bearer Independent Call Control protocol or ISDN User Part," Q.1912.5, Mar. 2004, 110 pages.

Camarillo, G., et al., "The Early Session Disposition Type for the Session Initiation Protocol (SIP)," Network Working Group, RFC3959, Dec. 2004, 12 pages.

Groves, C., et al., "Gateway Control Protocol Version 1," Network Working Group, RFC3525, Jun. 2003, 214 pages.

"H.248 Media Gateway Control Protocol," China Telecom, Dec. 31, 2003, pp. 62-63.

"Technical Specification Group Core Network; Interworking Between the IP Multimedia (IM) Core Network (CN) Subsystem and Circuit Switched (CS) Networks (Release 6)," 3GPP TS 29.163 v6.5.0, Dec. 2004, 128 pages.

* cited by examiner

METHOD FOR LISTENING TO SIGNAL TONE FROM A CALLED PARTY BY A CALLING PARTY DURING NETWORK INTERWORKING

This application is a continuation of copending application number PCT/CN2006/001049 filed May 22, 2006 which designated the U.S., claims the benefit thereof and incorporates the same by reference.

FIELD OF THE INVENTION

The present invention relates to interworking between a packet core network and a circuit domain network with Session Initiation Protocol (SIP) as call control signaling, and particularly to a method for listening to signal tone from a called party in a circuit domain network by a calling party in a packet core network during network interworking.

BACKGROUND OF THE INVENTION

Mobile communication has become a necessary part of people's life. With the popularization of mobile communication applications, people's demand for voice and data transmission is higher. Especially, video data transmission requires a bandwidth much more than the bandwidth for voice data transmission. At present, the second generation mobile communication systems, typically Global System for Mobile Communication (GSM) and Code Division Multiple Access (CDMA), have reached their limits of transmission rate. Therefore, the third generation (3G) mobile communication systems with higher data transmission rates emerge as the demand requires.

The IP Multimedia Subsystem (IMS) is an Internet Protocol (IP) multimedia subsystem in a Wideband Code Division Multiple Access (WCDMA) network defined in the 3rd Generation Partnership Project (3GPP) R5/R6 standard as well as the target network for implementing packet-based voice and data transmission and providing unified multimedia services and applications in 3G mobile networks.

The IMS employs an IP packet domain as its bearer channel for control signaling and media transmission and employs the Session Initiation Protocol (SIP) as call control signaling, and thereby implements separation among service management, session control, and bearer access.

IMS standard is a new standard and is improved progressively. At present, considerations are mainly taken to a 3G network itself rather than interworking between a 3G network and a circuit domain network. How an IMS calling party listens to ring-back tone or voice announcement is not considered in the current IMS standard when an interworking call is terminated in a circuit domain network, such as a Public Switched Telephone Network (PSTN) or an Integrated Services Digital Network (ISDN), and an Address Complete Message (ACM) is sent from the circuit domain network.

A PSTN termination procedure in the current 3GPP standard is shown in FIG. 1. It may be seen from FIG. 1 that the Media Gateway Control Function (MGCF) does not open a media stream channel by means of the H.248 protocol for a bidirectional connection until the circuit domain network sends an Answer Message (ANM) (step 13). However, the MGCF performs no similar operation to open a media stream channel when the circuit domain network sends an ACM message.

However, as we know, in one aspect, in the circuit domain network, when the called party sends an ACM message, the called party may send signal tone or voice announcement that is triggered by other service applications to indicate call failure, e.g., "No disturbing" voice announcement (if the called party has activated "No disturbing" service), "Incoming Call Barring" voice announcement (if the called party has activated Blacklist or Whitelist service), etc., besides ring-back tone (including customized ring-back tone, i.e., Customized Ring-Back Tone (CRBT)). Apparently, as shown in the procedure in FIG. 1, the MGCF does not begin media stream interaction when it receives the ACM message, and, as a result, the IMS calling party is unable to hear these ring-back tone, signal tone, or voice announcement.

In the standard ITU-T Q.1912.5 "Interworking between Session Initiation Protocol (SIP) and Bearer Independent Call Control Protocol or ISDN User Part", the solution for translation of ACM message in interworking between SIP and ISDN User Part (ISUP) is provided. Applied in an IMS network, the solution is: when the MGCF receives the ACM message, it determines whether the Called Party' Status Indicator in the message is "subscriber free", and if the indicator is "subscriber free", the MGCF will translate the ACM message into a 180 Ringing response message; otherwise the MGCF will translate the ACM message into a 183 Session Progress response message.

That solution determines whether the content sent from the circuit domain network is ring-back tone indicating successful call or signal tone or voice announcement indicating failed call according to different SIP response messages (180 and 183).

However, this solution is unable to be applied in the above IMS procedure, because:

As specified in the IMS standard, on receiving the INVITE message, the MGCF will perform a media negotiation process with the calling party in the Offer/Answer mode. As shown in FIG. 1 and FIG. 2 provided in the current 3GPP standard, it may be seen clearly that the process is completed before the MGCF receives the ACM message. However, as we know, as specified in SIP, after that process, the MGCF is unable to send a 183 Session Progress response message again (in FIG. 2, it may be seen clearly that the MGCF has sent a 183 Session Progress response message once the Offer/Answer mode is activated; therefore, it is unable to send a 183 Session Progress response message again when it receives the ACM message subsequently). Since the MGCF does not send an SIP response message to the calling party, even though the MGCF opens the media stream channel and the calling party may hear the signal tone or voice announcement indicating call failure, the call from the calling IMS network will be suspended (due to unknown condition in the called network) and thereby the call will enter into an incorrect signaling process, because the circuit domain network usually does not send another ANM message (due to the call failure).

In addition, as specified in the ITU-T Q.1912.5 standard, the 183 Session Progress response message may only encapsulate the ACM message in the SIP-I format; otherwise the ACM message may not be translated. However, as we know, there is no mandatory requirement for the SIP-I in the IMS standard. Actually, for the foresaid demand, it is enough to determine whether the called party is free by means of the 180 Ringing and 183 Session Progress messages, without the need of carrying the ACM message body in the 183 Session Progress message.

SUMMARY OF THE INVENTION

According to the embodiments of the present invention, there is provided a method for listening to signal tone from a called party by a calling party during network interworking, so that the IMS calling party may receive signal tone from the called party in a circuit domain network.

According to the embodiments of the present invention, there is provided a method for listening to signal tone from a called party by a calling party during network interworking applicable to a packet core network with SIP as call control signaling. The packet core network is connected to a circuit domain network via a Media Gateway Control Unit (MGCU) and accesses a user terminal via a network access node. The method includes:

instructing a media gateway (MGW) to open a media stream channel when the MGCU receives an Address Complete message or Call Progress message from the circuit domain network, and sending a ringing response message to the packet core network if the received message carries an indicator indicating the called party is free.

Wherein, instructing a media gateway to open a media stream channel is instructing a media gateway to establish a unidirectional connection.

Wherein, the method further comprises:

opening the media stream channel when a media control device of the calling party receives the ringing response message.

Furthermore, the method further comprises:

sending a response message carrying an indicator of failed call but successful media stream setup or a response message indicating failed call but successful media stream setup to the packet core network when the media gateway control unit receives the Address Complete message or Call Progress message from the circuit domain network and the received message does not carry the indicator indicating the called party is free.

Wherein, the indicator indicating the called party is free includes at least one of: a subscriber free indicator, an in-band information indicator, and a cause indicator.

Wherein, the media control device of the calling party is at least one of a terminal of the calling party and a network access node of the calling party.

According to an embodiment of the present invention, there is also provided a method for listening to signal tone from a called party by a calling party during network interworking applicable to a packet core network with SIP as call control signaling. The packet core network is connected to a circuit domain network via an MGCU. The method includes:

sending a response message carrying indicator of failed call but successful media stream setup or a response message indicating failed call but successful media stream setup to the packet core network when the media gateway control unit receives an Address Complete message or Call Progress message from the circuit domain network and the received message does not carry an indicator indicating the called party is free.

Wherein, the indicator indicating the called party is free includes at least one of: a subscriber free indicator, an in-band information indicator, and a cause indicator.

According to an embodiment of the present invention, there is also provided a communication system, in which a calling party in a packet core network is able to hear signal tone from a called party in a circuit domain network during network interworking, including:

a network access node, providing registration, authentication and authentification services for a user terminal to access a packet core network and translating between SIP and other access protocols;

a call session control unit, providing call control, route switching, and other functions for a registered user which accesses the packet core network and triggering a call to a service control unit;

a service control unit, providing a variety of service logic control functions for the registered user which accesses the packet core network, and serving as the host execution environment for the services;

a media resource control unit, providing control functions of media resource request, application, and release for the registered user which accesses the packet core network;

a media gateway control unit, providing interworking control function for a call between the registered user in the packet core network and another user in the circuit domain network and translating between SIP and other call control protocols.

It may be seen from the comparison that the main difference between the technical scheme of the embodiments of the present invention and the prior art lies in: when the MGCU receives the backward ACM message or CPG message and if the media negotiation in the Offer/Answer mode has been completed, the MGCU will instruct the MGW to change the connection through H.248 interaction to start a media stream. In addition, if the ACM or CPG message does not carry a subscriber free indicator, the MGCU will send a response message carrying an indicator of failed call but successful media stream setup or a response message indicating failed call but successful media stream setup.

The difference in technical scheme brings apparent benefits, i.e., since the media stream channel may be opened timely, the calling party may receive customized ring-back tone as well as signal tone or voice announcement indicating call failure from the circuit domain network, such as the "No disturbing" voice announcement, the "Incoming Call Barring" voice announcement, etc. In addition, the calling network may know the condition in the called network, and thereby a completed call signaling process may be established.

DETAILED DESCRIPTION OF THE EMBODIMENTS

To make the object, technical scheme, and advantages of the present invention understood more clearly, the present invention will be further detailed with reference to the embodiments and the accompanying drawings.

As we know, the IMS defined by 3GPP is virtually a packet core network with SIP as call control signaling. Therefore, the present invention is applicable to all packet core networks which are similar to the IMS in architecture and employ SIP as call control signaling, enabling the calling party in the packet core network to receive customized ring-back tone or signal tone or voice announcement which indicates call failure, such as "No disturbing" or "Incoming Call Barring" voice announcement, etc.

Figure 1:
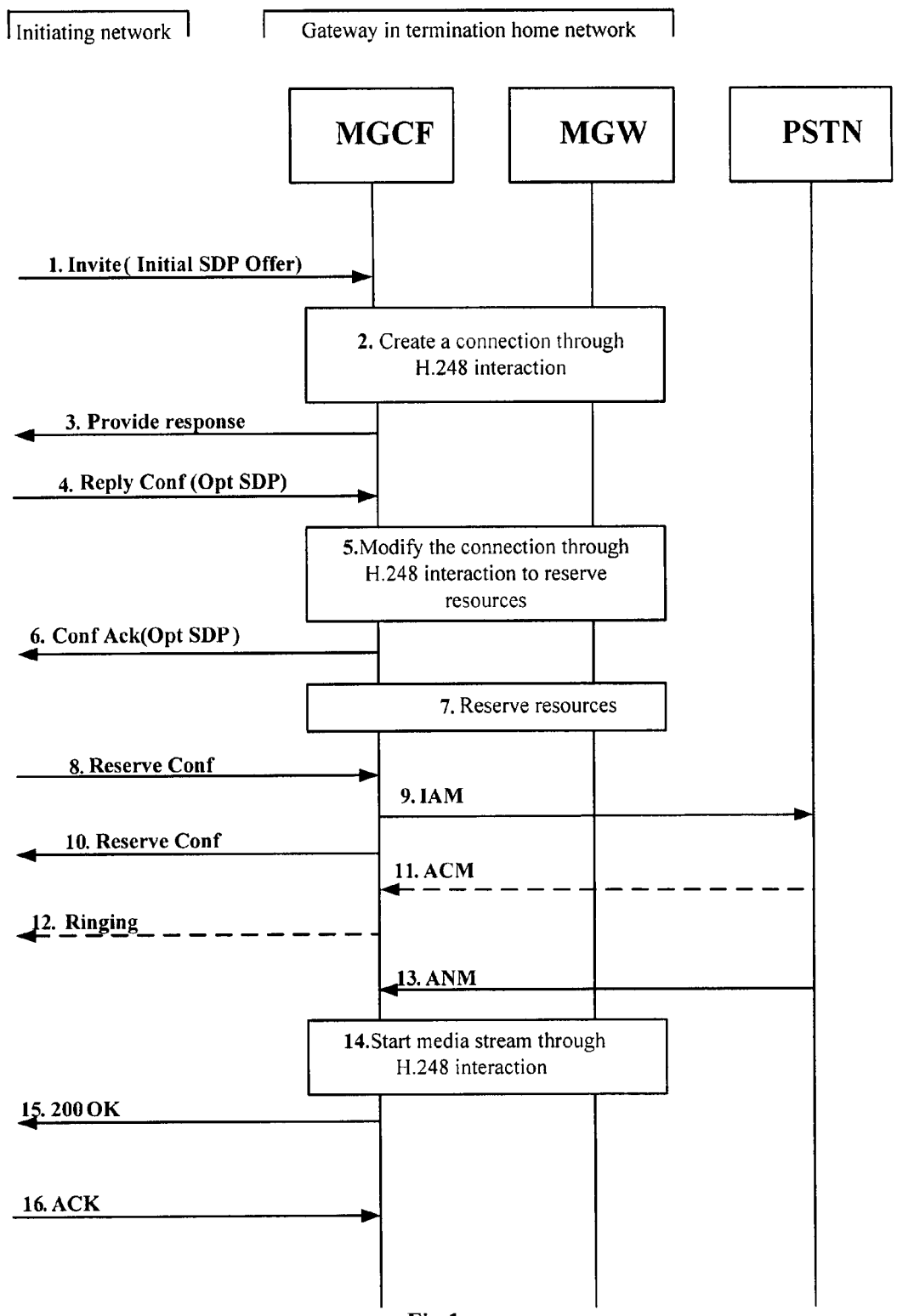
FIG. 1 is a diagram illustrating sequences of a PSTN termination procedure in the current 3GPP standard.
Figure 2:
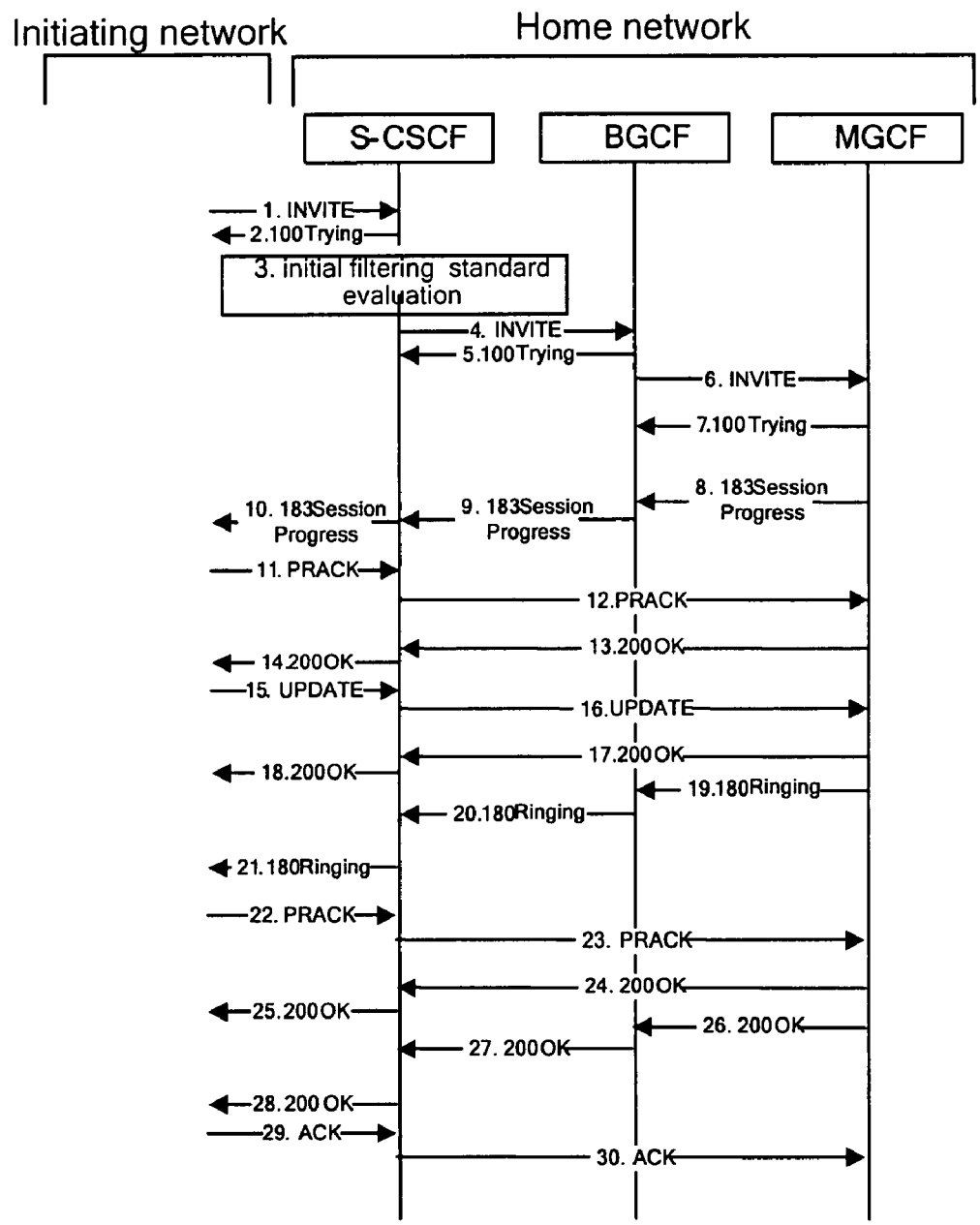
FIG. 2 is a diagram illustrating sequences of a PSTN termination procedure performed by an initiator in a home network in the current 3GPP standard.
Figure 3:
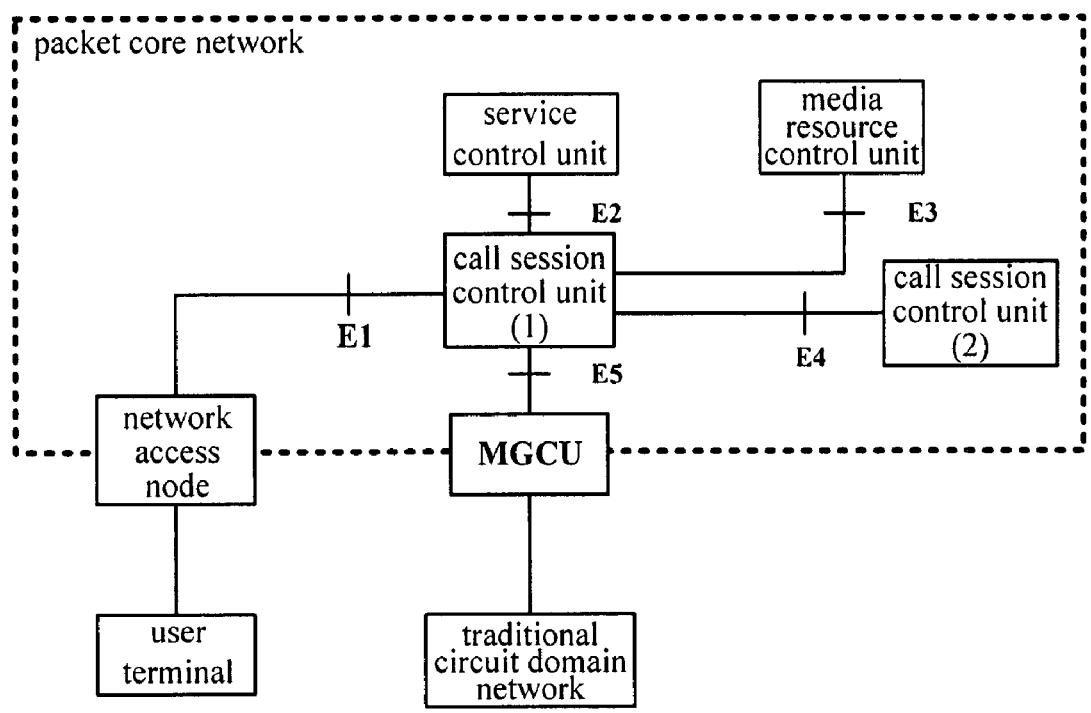
FIG. 3 is a diagram illustrating sequences of a communication system according to an embodiment of the present invention.

FIG. 3 shows a communication system to which the method according to one embodiment of the present invention may be applied. In FIG. 3, a user terminal, a network access node, a call session control unit (1) and a call session control unit (2), a service control unit, a media resource control unit, an MGCU, and a circuit domain network, etc., are shown. Wherein, the packet core network in the communication system employs SIP as call control signaling.

Wherein, the user terminal may be any communication terminal which may access the packet core network, such as a traditional fixed telephone, an ISDN terminal, an SIP terminal, an H.323 terminal, a softphone, a Global System for Mobile Communication (GSM) mobile telephone, a Code Division Multiple Access (CDMA) mobile telephone, a 3G mobile telephone, a Wireless Local Area Network (WLAN) terminal, and a Personal Handyphone System (PHS) terminal, etc.

The network access node is a network node which provides registration, authentication and authentification services for a user terminal to access a packet core network as well as translation between SIP and other access protocols. Via the network access node, the user terminal may be registered in different call session control units and service control units.

The call session control unit (1) and the call session control unit (2) are designed to provide call control, route switching, and other functions for registered users which access the packet core network and may trigger calls to the service control unit. The E4 interface between the two call session control units is SIP.

The service control unit is designed to provide a variety of service logic control functions for registered users which access the packet core network and serves as the host execution environment for the services. A plurality of control units for different services may exist in the packet core network.

The media resource control unit is designed to provide control functions of media resource request, application, and release for registered users which access the packet core network, such as resources for signal tone and voice announcement, resources for conference, and resources for number receiving, etc.

The MGCU is designed to provide interworking control function for calls between registered users in the packet core network and users in other circuit domain networks and accomplish translation between SIP and other call control protocols.

In addition, the E1 interface between the network access node and the call session control unit (1) is SIP if the network access node and the call session control unit (1) are different physical entities. The E1 interface may be SIP or a customized internal interface if the network access node and the call session control unit (1) are the same physical entity.

The E2 interface between the service control unit and the call session control unit (2) is SIP if the two control units are different physical entities. The E2 interface' may be SIP or a customized internal interface if the two control units are the same physical entity.

The E3 interface between the media resource control unit and the call session control unit (1) is SIP if the two control units are different physical entities. The E3 interface may be SIP or a customized internal interface if the two control units are the same physical entity.

The E4 interface between the two call session control units (1) and (2) is SIP.

The E5 interface between the MGCU and the call session control unit (1) is SIP if the MGCU and the call session control unit (1) are different physical entities. The E5 interface may be SIP or a customized internal interface if the MGCU and the call session control unit (1) are the same physical entity.

The communication system to which the embodiment of the present invention may be applied is described above. Hereunder the technical scheme of the embodiment of the present invention will be described.

In the technical scheme according to the embodiments of the present invention, when receiving the ACM or CPG (Call ProGress) message from the circuit domain network, the MGCU instructs the MGW to open a media stream channel, and, if the MGCU determines the ACM or CPG message does not carry a subscriber free indicator, it sends a 180 Ringing response message or 200 OK response message carrying a call failure indicator, or a provisional response message or successful response message indicating failed call but successful media stream setup(hearing) to the calling network.

In the above technical scheme, the calling party is a user in the packet core network, while the called party is a user in the circuit domain network (e.g., ISDN or PSTN user).

Figure 4:
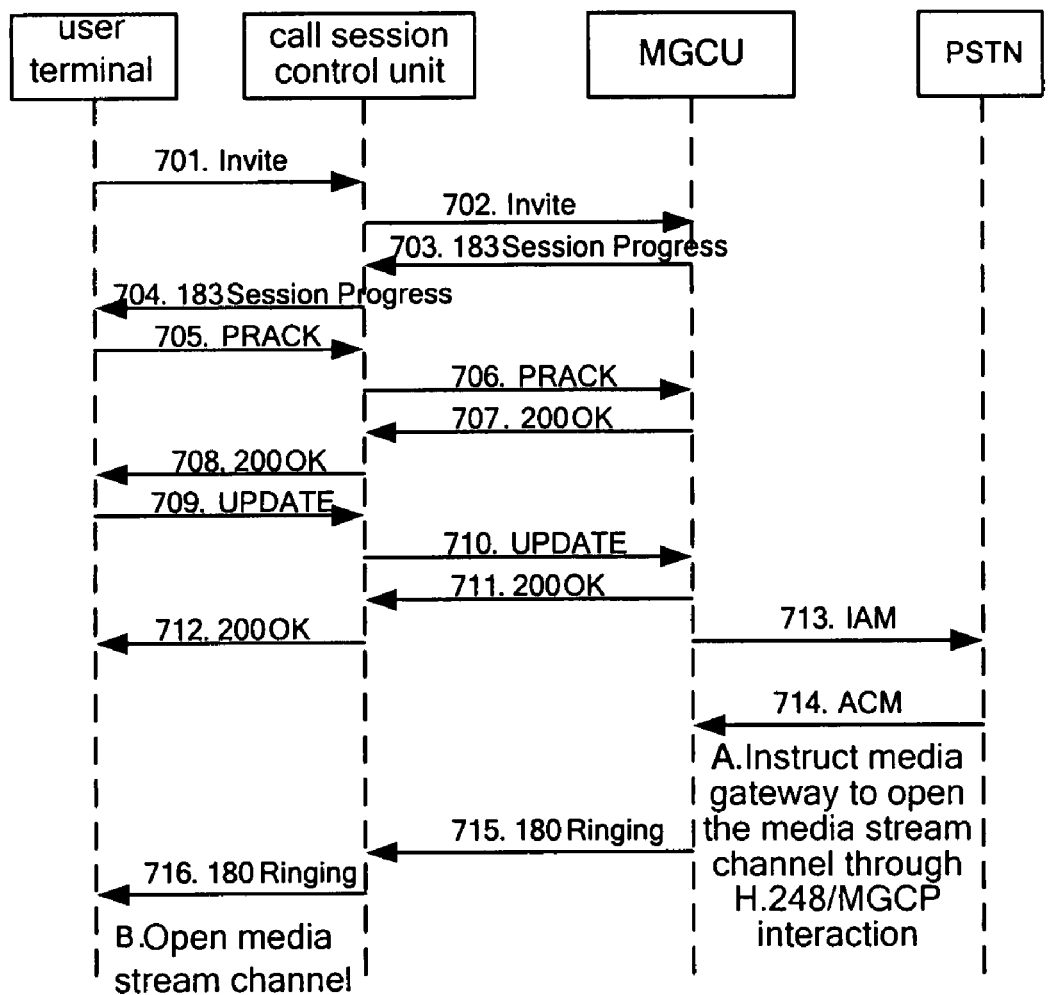
FIG. 4 is a diagram illustrating sequences of a process for listening to signal tone from a called party by a calling party during network interworking according to an embodiment of the present invention.

Hereunder an embodiment of the technical scheme in the present invention will be described with reference to FIG. 4.

In step 701, the calling party initiates a call and sends an INVITE message to the call session control unit.

Next, in step 702, the call session control unit parses the called address and determines the called address belongs to the circuit domain network, and sends an INVITE message to the MGCU.

Next, in step 703, the MGCU begins the media negotiation process in Offer/Answer mode with the calling party (from step 703 to step 712), and sends 183 Session Progress response message to the call session control unit.

Next, in step 704, the call session control unit forwards the 183 Session Progress response message to the calling party terminal.

Next, in step 705, the calling party terminal sends a PRACK message.

Next, in step 706, the call session control unit forwards the PRACK message to the MGCU.

Next, in step 707, the MGCU sends a 200 OK response message in response to the PRACK message.

Next, in step 708, the call session control unit forwards the 200 OK response message to the calling party terminal.

Next, in step 709, the calling party terminal sends an UPDATE message.

Next, in step 710, the call session control unit forwards the UPDATE message to the MGCU.

Next, in step 711, the MGCU sends a 200 OK response message in response to the UPDATE message.

Next, in step 712, the call session control unit forwards the 200 OK response message to the calling party terminal. Now, the media negotiation process is completed.

Next, in step 713, the MGCU sends an Initial Address Message (IAM) to the circuit domain network (e.g., PSTN).

Next, in step 714, when the PSTN network finds the called address, it sends an ACM message to the MGCU. The MGCU interacts with the MGW with H.248 or MGCP protocol to instruct the MGW to modify the media connection to open the media stream channel. In order to prevent problems related with bidirectional connection (e.g., echo), here the media stream channel is opened preferably for unidirectional connection, i.e., the calling party only receives media but does not send media. Accordingly, the called party only sends media but does not receive media.

Next, in step 715, the MGCU determines whether the received ACM message carries a subscriber free indicator. If the ACM message carries a subscriber free indicator, the MGCU will translate the ACM message into a 180 Ringing response message and send the 180 Ringing response message to the call session control unit, so that the calling party may hear the ring-back tone indicating successful call. Otherwise the MGCU translates the ACM message into a response message carrying an indicator of failed call but successful media stream setup (e.g., 180 Ringing, 183 Session Progress, or 200 OK, etc.) or a provisional or successful response message indicating failed call but successful media stream setup (hearing), so that the calling party may hear signal tone or voice announcement indicating failed call.

It may be seen that the indicator of failed call but successful media stream setup carried in the response message may be an SIP header field instead of the foresaid SIP-I format for ACM encapsulation. Wherein, that the called party is not free may be determined by determining that the received ACM message does not carry a subscriber free indicator, or by determining that the ACM message carries an "In-band information indicator" (set to "1"), or by determining that the ACM message carries "Cause indicators" (set to a cause value indicating failed call but successful media stream setup (hearing), such as, cause value "4" (send special tone), etc.).

Next, in step 716, the call session control unit forwards the 180 Ringing response message to the calling party terminal. When the calling party terminal receives the 180 Ringing response message, if it finds the media negotiation process has been completed, it will open the media stream channel to receive the media stream from the called party.

Though the embodiment is described with the example of the ACM message, the process is also applicable to the case of the CPG message, because the CPG message is similar to the ACM message.

With the method according to the embodiments of the present invention, the calling party may hear the ring-back tone from the circuit domain network in the case of successful call. In addition, in case of failed call, the calling party may hear signal tone or voice announcement from the circuit domain network by means of protocol translation.

While the present invention has been illustrated and described with reference to some preferred embodiments, those skilled in the art may recognize that various variations and modifications may be made without departing from the spirit and scope of the present invention as defined by the accompanying claims.

What is claimed is:

1. A method for listening to a signal tone from a called party by a calling party during network interworking applicable to an Internet Protocol Multimedia Subsystem (IMS) network which employs Session Initiation Protocol (SIP) as call control signaling, wherein the IMS network is connected to a circuit domain network via a Media Gateway Control Unit and accesses a user terminal via a network access node, the method comprising:

instructing, by the Media Gateway Control Unit, a media gateway (MGW) to open a media stream channel when the media gateway control unit receives an Address Complete message or Call Progress message from the circuit domain network, sending, by the Media Gateway Control Unit, a ringing response message to the calling party of the IMS network if the received Address Complete message or Call Progress message carries an indicator indicating the called party is free; and sending, by the Media Gateway Control Unit, a call failure indicator of a failed call but successful media stream setup to the calling party of the IMS network if the received Address Complete message or Call Progress message does not carry the indicator indicating the called party is free; and receiving, by the calling party of the IMS network, a ring-back tone indicating successful call through the media stream channel if the calling party receives the ringing response message, or a signal tone or voice announcement indicating failed call through the media stream channel if the calling party receives the call failure indicator of the failed call but successful media stream setup;

wherein the calling party is a user in the IMS network, while the called party is a user in a circuit domain network.

2. The method of claim 1, wherein instructing the media gateway to open a media stream channel comprises instructing the media gateway to establish a unidirectional connection.

3. The method of claim 2, further comprising:

opening the media stream channel when a media control device of the calling party receives the ringing response message.

4. The method of claim 1, wherein the indicator indicating the called party is free comprises at least an indicator selected from the group consisting of a subscriber free indicator, an in-band information indicator, and a cause indicator.

5. The method of claim 3, wherein the media control device of the calling party is at least one of a terminal of the calling party and a network access node of the calling party.

6. A communication system, in which a calling party is able to hear a signal tone from a called party in a circuit domain network during network interworking applicable to an Internet Protocol Multimedia Subsystem (IMS) network which employs Session Initiation Protocol (SIP) as call control signaling, the communication system comprising:

a network access node, configured to provide registration and authentication services for a user terminal to access the IMS network and to translate between SIP and other access protocols;

a call session control unit, configured to provide call control, route switching, and other functions for a registered user which accesses the IMS network and to trigger a call to a service control unit;

a service control unit, configured to provide service logic control functions for the registered user which accesses the IMS network, and to serve as a host execution environment for the services;

a media resource control unit, configured to provide control functions of media resource request, application, and release for the registered user which accesses the IMS network; and a media gateway control unit, configured to provide an interworking control function for a call between the registered user in the IMS network and another user in the circuit domain network and to translate between SIP and other call control protocols;

wherein, upon receiving an Address Complete message or Call Progress message from the circuit domain network, the media gateway control unit is configured to instruct a media gateway (MGW) to open a media stream channel, and to send a ringing response message to the calling party of the IMS network if the received Address Complete message or Call Progress message carries an indicator indicating the called party is free, or to send a call failure indicator of a failed call but a successful media stream setup to the calling party of the IMS network if the received Address Complete message or Call Progress message does not carry the indicator indicating the called party is free;

wherein the calling party of the IMS network is configured to receive a ring-back tone indicating successful call through the media stream channel if it receives the ringing response message, or a signal tone or voice announcement indicating failed call through the media stream channel if it receives the call failure indicator of the failed call but successful media stream setup; and wherein the calling party is a user in the IMS network, while the called party is a user in a circuit domain network.

7. The communication system of claim 6, wherein an interface is arranged between the network access node and the call session control unit, and wherein the interface is SIP or a customized internal interface.

8. The communication system of claim 6, wherein an interface is arranged between the service control unit and the call session control unit and wherein the interface is SIP or a customized internal interface.

9. The communication system of claim 6, wherein an interface is arranged between the media resource control unit and the call session control unit and wherein the interface is SIP or a customized internal interface.

10. The communication system of claim 6, wherein an interface is arranged between the media gateway control unit and the call session control unit and wherein the interface is SIP or a customized internal interface.

11. The method of claim 1, wherein the call failure indicator of failed call but successful media stream setup is carried in a 180 Ringing response message.

12. The method of claim 1, wherein the call failure indicator of failed call but successful media stream setup is carried in a 200 OK response message.

13. The method of claim 1, wherein the call failure indicator of failed call but successful media stream setup is a provisional response message or a successful response message.

14. The method of claim 1, wherein the call failure indicator of failed call but successful media stream setup is carried in an SIP header field.

* * * * *